(12) United States Patent
Nishida et al.

(10) Patent No.: US 7,982,786 B2
(45) Date of Patent: Jul. 19, 2011

(54) SOLID-STATE IMAGING DEVICE FOR COLOR IMAGING

(75) Inventors: Yoshiyasu Nishida, Miyagi (JP);
Hirokazu Kobayashi, Saitama (JP);
Mitsuru Iwata, Odawara (JP);
Yoshinori Furuta, Miyagi (JP); Daisuke Kusuda, Miyagi (JP)

(73) Assignee: Fujifilm Corporation, Tokyo (JP)

( * ) Notice: Subject to any disclaimer, the term of this patent is extended or adjusted under 35 U.S.C. 154(b) by 450 days.

(21) Appl. No.: 12/259,675

(22) Filed: Oct. 28, 2008

(65) Prior Publication Data

US 2009/0109307 A1    Apr. 30, 2009

(30) Foreign Application Priority Data

Oct. 29, 2007   (JP) .............................. P2007-280599

(51) Int. Cl.
*H04N 3/14* (2006.01)
*H04N 5/335* (2006.01)
*H04N 9/04* (2006.01)
*G01J 3/45* (2006.01)

(52) U.S. Cl. ...................................... 348/272; 356/451

(58) Field of Classification Search .......... 348/272–276; 356/450, 451, 453; 359/232, 247
See application file for complete search history.

(56) References Cited

U.S. PATENT DOCUMENTS

| | | | |
|---|---|---|---|
| 6,654,056 B1* | 11/2003 | Perregaux et al. | 348/275 |
| 7,612,811 B2* | 11/2009 | Takeuchi et al. | 348/272 |
| 2003/0063204 A1* | 4/2003 | Suda | 348/272 |
| 2007/0145241 A1 | 6/2007 | Tani | |
| 2007/0171290 A1* | 7/2007 | Kroger | 348/272 |
| 2009/0040520 A1* | 2/2009 | Misawa et al. | 356/326 |

FOREIGN PATENT DOCUMENTS

JP   2007-180157 A   7/2007

* cited by examiner

*Primary Examiner* — Kelly L Jerabek
(74) *Attorney, Agent, or Firm* — Birch, Stewart, Kolasch & Birch, LLP (57) ABSTRACT

A solid-state imaging device includes a plurality of photoelectric conversion elements provided at a surface portion of a semiconductor substrate by being arranged in a form of a two-dimensional array, spectral elements each provided on a number of the photoelectric conversion elements which are arranged linearly, a trapezoidal opening which is longitudinally elongated in a direction from a base toward an upper side thereof and which introduces incident light to the number of the photoelectric conversion elements being provided in each of the spectral elements, so as to cause spectral separation in the longitudinal direction by interference between the incident light and light reflected on inner side surfaces of the trapezoidal opening and a signal reading unit for reading a signal which is detected by each of the number of the photoelectric conversion elements arranged in the longitudinal direction by receiving the light incident through the trapezoidal opening.

10 Claims, 11 Drawing Sheets

SOLID-STATE IMAGING DEVICE FOR COLOR IMAGING

CROSS-REFERENCE TO RELATED APPLICATIONS

This application claims the benefit of Japanese Patent Application JP 2007-280599, filed Oct. 29, 2007, the entire content of which is hereby incorporated by reference, the same as if set forth at length.

FIELD OF THE INVENTION

The present invention relates to a solid-state imaging device for capturing a color image, and more particularly to a solid-state imaging device which is capable of capturing a color image without using color filters.

BACKGROUND OF THE INVENTION

As solid-state imaging devices for capturing color images, single-plate type imaging devices such as a complementary metal oxide semiconductor (CMOS) type, a charge coupled device (CCD) type, and the like are conventionally known. As described in JP-A-2007-180157 (corresponding to US2007/0145241A1), for example, these solid-state imaging devices are structured such that a plurality of photodiodes, i.e., photoelectric conversion elements, are formed at the surface portion of a semiconductor substrate in the form of a two-dimensional array, a light shielding film is laminated thereon, openings enabling the incidence of light upon the photodiodes are provided at those portions of this light shielding film that face the photodiodes, and color filters are respectively overlaid thereon.

As the color filters, there are many cases where the three primary colors of red (R), green (G), and blue (B) are used. A color filter of green (G) is overlaid on about half of the plurality of photodiodes formed in the two-dimensional array, a color filter of red (R) is overlaid on a half of the remaining half, and a color filter of blue (B) is overlaid on the remainder. The color filters of the respective colors are respectively arrayed so as to be averagely scattered over the entire light receiving surface of the solid-state imaging device.

In the above-described conventional solid-state imaging device, one light shielding film opening corresponds to one photodiode, and the color filter of one color corresponds to one light shielding film opening. For this reason, approximately two-thirds of the light incident upon one photodiode is absorbed by the color filter (for example, blue light and green light incident upon the red color filter are absorbed and converted to heat), so that, in principle, there is a problem in that the light utilization efficiency is low.

In addition, an optical image of an object formed on the light receiving surface of the solid-state imaging device is subjected to sampling and converted to electrical signals by the respective photodiodes. In the above-described conventional structure, however, since a sampling point of red, a sampling point of green, and a sampling point of blue are all different, signal processing is required in which detection signals of green and blue at the sampling point of red are determined by performing the interpolation calculation of signals obtained from circumjacent sampling points of green and blue. Hence, there is another problem in that a decline in the quality of the captured image due to the positional offset of sampling points is, in principle, unavoidable.

SUMMARY OF THE INVENTION

An object of the invention is to provide an innovative novel solid-state imaging device for capturing a color image which is high in the light utilization efficiency and capable of obtaining detection signals of a plurality of colors with one opening.

In accordance with a first aspect of the invention there is provided a solid-state imaging device for capturing a color image comprising: a plurality of photoelectric conversion elements formed at a surface portion of a semiconductor substrate by being arranged in the form of a two-dimensional array; spectral elements each placed on a predetermined number of the photoelectric conversion elements arranged linearly, a trapezoidal opening which is longitudinally elongated in a direction from a base toward an upper side thereof and which introduces incident light to the predetermined number of the photoelectric conversion elements being provided in each of the spectral elements, so as to cause spectral separation in the longitudinal direction by interference between the incident light and light reflected on inner side surfaces of the trapezoidal opening; and signal reading means for reading a signal which is detected by each of the predetermined number of the photoelectric conversion elements arranged in the longitudinal direction by receiving the light incident through the trapezoidal opening.

The solid-state imaging device for capturing a color image according to a second aspect of the invention is characterized in that if the trapezoidal opening and the predetermined number of the photoelectric conversion elements arranged in the longitudinal direction of the trapezoidal opening are set as a unit pixel, orientations in the direction from the base toward the upper side of two unit pixels adjacent to each other on a lateral side of the trapezoidal opening are arranged opposite to each other.

The solid-state imaging device for capturing a color image according to a third aspect of the invention is characterized in that the unit pixels are formed by being arranged in a lattice form.

The solid-state imaging device for capturing a color image according to a fourth aspect of the invention is characterized in that lateral sides of the trapezoidal openings which are adjacent to each other in the longitudinal direction are arranged in a straight line.

The solid-state imaging device for capturing a color image according to a fifth aspect of the invention is characterized in that the two trapezoidal openings which are adjacent to each other in the longitudinal direction are formed by being arranged with the bases or the upper sides thereof adjacent to each other.

The solid-state imaging device for capturing a color image according to a sixth aspect of the invention is characterized in that even-numbered rows of the unit pixels are formed by being arranged offset by a ½ pitch with respect to odd-numbered rows of the unit pixels.

The solid-state imaging device for capturing a color image according to a seventh aspect of the invention is characterized in that, in the unit pixels which are adjacent to each other in a perpendicular direction to the longitudinal direction, the photoelectric conversion elements for receiving the light of a same color are provided by being aligned in the perpendicular direction.

The solid-state imaging device for capturing a color image according to an eighth aspect of the invention is characterized in that the unit pixels are arranged on the light receiving surface by using as a unit four of the unit pixels which form a parallelogram isosceles configured by adjoining a first pair in which two of the unit pixels adjacent to each other on the lateral side are arranged in mutually opposite directions and a second pair in which the first pair is rotated substantially 90 degrees.

The solid-state imaging device for capturing a color image according to a ninth aspect of the invention is characterized in that the unit pixels are arranged such that positions of the unit pixels for detecting the same color are adjacent to each other.

In accordance with a 10th aspect of the invention there is provided a signal addition method of the solid-state imaging device for capturing a color image according to the fifth aspect of the invention, comprising the steps of: adding signals which are read from positions of the bases of the two unit pixels whose bases are adjacent to each other; adding signals which are read from positions of the upper sides of the two unit pixels whose upper sides are adjacent to each other; and adding signals which are read from intermediate positions between the base and the upper side of the two unit pixels whose lateral sides are adjacent to each other.

According to the invention, signals of a plurality of colors for generating a color image can be detected by one opening, and members which thermally consume the light wastefully as in the case of color filters are not used, so that the light utilization efficiency is enhanced.

Furthermore, since spectral elements having trapezoidal openings are densely arranged on the light receiving surface of the solid-state imaging device, the configuration becomes such that two adjacent trapezoidal openings are configured to be entangled. Therefore, it becomes possible to reduce image deterioration due to the folded distortion even if optical low-pass filters are not used.

DESCRIPTION OF REFERENCE NUMERALS AND SIGNS

1: spectral element
2: trapezoidal opening
2a: upper side (short side)
2b: lower side (base, long side)
4r: photodiode for red detection
4g: photodiode for green detection
4b: photodiode for blue detection
12: light shielding film portion (position for forming a vertical charge transfer path)

DETAILED DESCRIPTION OF THE INVENTION

Hereafter, a description will be given of the embodiments of the invention with reference to the accompanying drawings.

Figure 1:
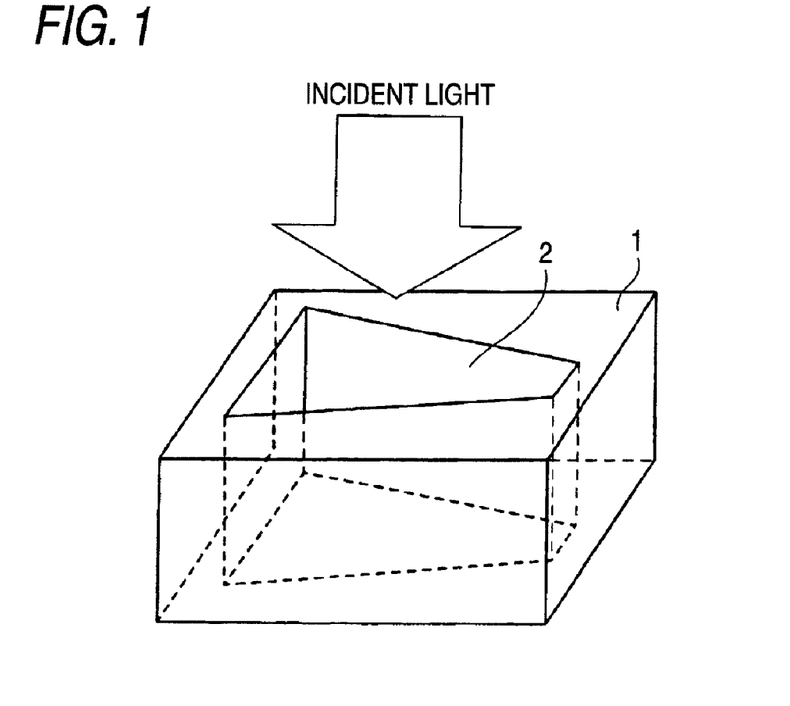
FIG. 1 is a perspective view of a spectral element which is used in a solid-state imaging device in accordance with an embodiment of the invention.

FIG. 1 is a perspective view of a spectral element which is used in a solid-state imaging device for capturing a color image in accordance with an embodiment of the invention. This spectral element 1 is formed of a thick metal plate in accordance with this embodiment, and in the illustrated example an opening 2 which is trapezoidal in a top view is provided penetratingly from an upper surface to a lower surface.

Inner side surfaces of the opening 2 may be provided vertically with respect to upper and lower surfaces, or may be provided in an inclined manner to provide a tapered opening such that the opening in the lower surface becomes smaller with a similar figure with respect to the opening in the upper surface.

The reason that the spectral element 1 is formed of a thick metal plate is that it is necessary to provide a sufficient length (thicknesswise length) for the inner side surfaces of the opening 2. Spectral separation occurs on the lower surface side of the spectral element 1 as interference is caused to take place between white light made incident into the opening 2 and the light reflected by the inner side surfaces of the opening 2 in this white light. Preferably, a polarizing element is provided on the spectral element 1 to polarize the incident light in a longitudinal direction of the trapezoidal opening 2 (i.e., in the heightwise direction of the trapezoid; this trapezoidal opening 2 has a longer heightwise length than the length of the base) and to be made incident into the interior of the opening 2, because spectral separation is likely to occur.

The spectral element 1 is formed of a thick material to reflect the incident light on the inner side surfaces of the opening 2; however, the spectral element 1 need not be a thick metal plate. For example, the opening 2 may be formed in a semiconductor substrate by using an integrated circuit manufacturing technique, and metal film with high reflectance may be formed on its inner side surfaces and upper surface. The reflecting film on the upper surface functions as a light shielding film.

Figure 2:
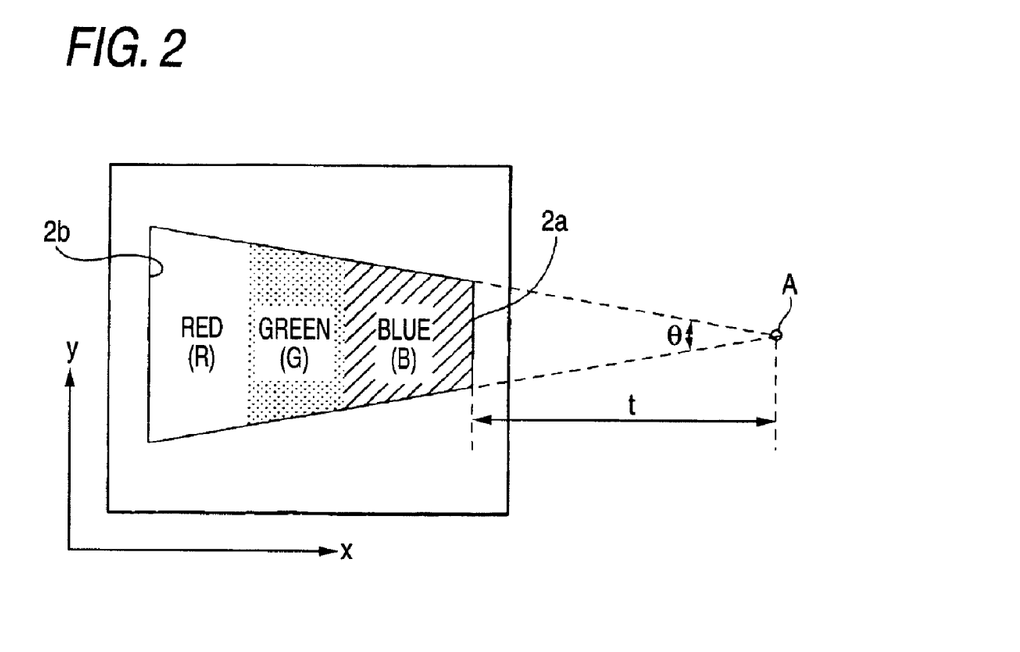
FIG. 2 is a plan view of the spectral element shown in FIG. 1.

FIG. 2 is an explanatory diagram of the opening 2. The opening 2 is formed in a trapezoidal shape in a top view. The opening 2 may be a trapezoid with four angular corners, or may have a shape whose four corners are roundly shaped. Still alternatively, the opening 2 may have the shape of an isosceles triangle whose upper side is infinitely close to a "point." For this reason, the description is given by using the term "trapezoidal" opening.

When both side faces of the trapezoidal opening 2 are extended, an isosceles triangle is obtained in a top view, and by providing the opening 2 by adjusting an apex angle θ of this isosceles triangle to a narrow angle of not more than a predetermined angle, it is possible to adjust the degree of spectral separation occurring inside the opening 2. In addition, by providing the opening 2 by adjusting a distance t extending perpendicularly from the apex A to an upper side 2a of the trapezoidal opening 2, it is possible to define the short wavelength side of the spectrally separated light.

As for the size of the opening 2, the height of the trapezoid is at most 10 µm or thereabouts, and the width (the length of a lower side 2b) is at most 1 µm or thereabouts. However, the size of the opening 2 is not limited to the same since it also depends on the thickness of the spectral element 1, the angle of inclination of each inner side surface of the opening 2 in a case where each inner side surface of the opening 2 is provided not vertically but in an inclined manner, the aforementioned apex angle θ, and the like.

The degree to which the color of a long wavelength is spectrally separated toward the base 2b of the trapezoid (opening 2) becomes strong, whereas the degree to which the color of a short wavelength is spectrally separated toward the short side (upper side) 2a thereof becomes strong. For this reason, it is preferable to select the aforementioned θ, t, thickness, angle of inclination, length of the base 2b, the kind (reflectance) of the metal used, and so forth to allow red (R), green (G), and blue (B) to be spectrally separated in sequence from the base 2b toward the upper side 2a, so that a signal processing technique developed for a solid-state imaging device with an existing RGB color filter mounted thereon can be applied as it is. However, by detecting the amount of light received for each spectral separation, instead of spectrally separating the light into the three primary colors of R, G, and B, it is possible to reproduce a color image of the object.

Figure 3:
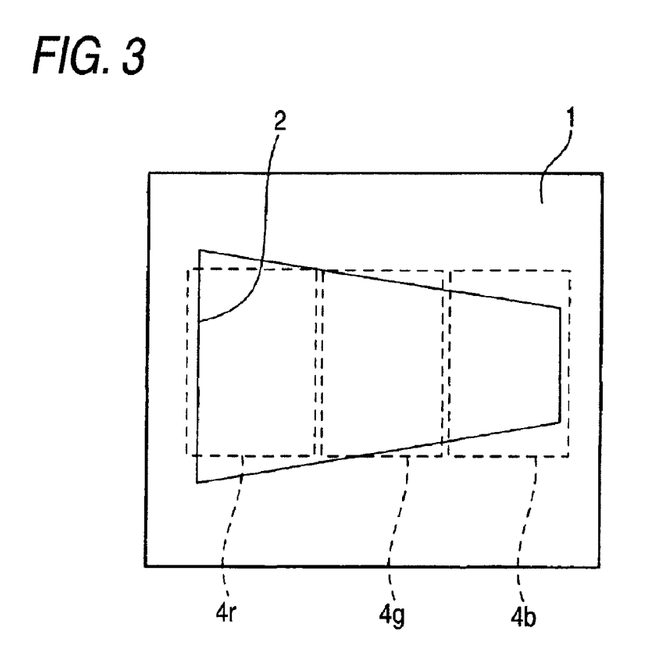
FIG. 3 is a layout diagram of photodiodes with respect to the spectral element shown in FIG. 1.

Hereafter, a description will be given by assuming that the spectral element 1 in accordance with this embodiment spectrally separates the incident light into the three primary colors of R, G, and B. FIG. 3 is an explanatory diagram of photodiodes which are provided underneath one opening 2. In the illustrated example, three photodiodes 4r, 4g, and 4b are provided in a juxtaposed manner from the base 2b toward the upper side 2a of the trapezoidal opening 2. Namely, the spectral element 1 is mounted on the three successively arranged photodiodes 4r, 4g, and 4b among the plurality of photodiodes formed on a semiconductor substrate in the form of a two-dimensional array, to thereby form one unit pixel.

Since almost all of the light incident into the opening 2 of this unit pixel is made incident after being spectrally separated into any one of the three photodiodes 4r, 4g, and 4b, and contributes to photoelectric conversion, its light utilization efficiency is high, and it becomes possible to capture a high-sensitivity object image.

It should be noted that in a case where the spectral element 1 is so designed as to spectrally separate the light into, for example, six components of light, one photodiode is allotted to each spectral separation, and one spectral element 1 is mounted on the six linearly arranged photodiodes, to thereby form one unit pixel.

Figure 4:
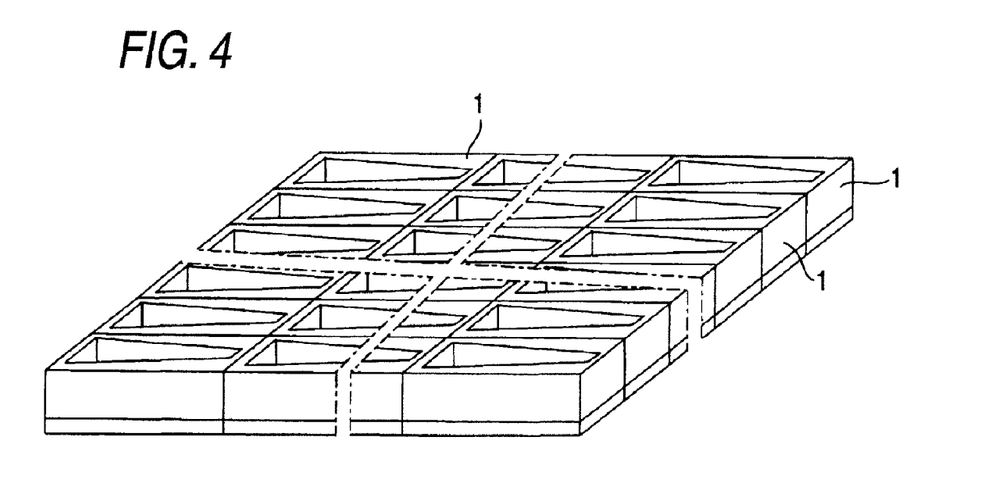
FIG. 4 is a perspective view of an assembly of spectral elements which are arranged in the form of a two-dimensional array.

FIG. 4 is a perspective view illustrating a state in which the unit pixels, one of which is shown in FIG. 3, are arranged in the form of a two-dimensional array. In the illustrated example, lines separating the individual spectral elements 1 are shown. In reality, however, the plurality of trapezoidal openings 2 are formed in a metal plate (or a semiconductor substrate or the like) of a one-plate configuration in the form of a two-dimensional array, and this metal plate (or the semiconductor substrate or the like) is disposed such that each opening 2 lies over the three photodiodes.

Figure 5:
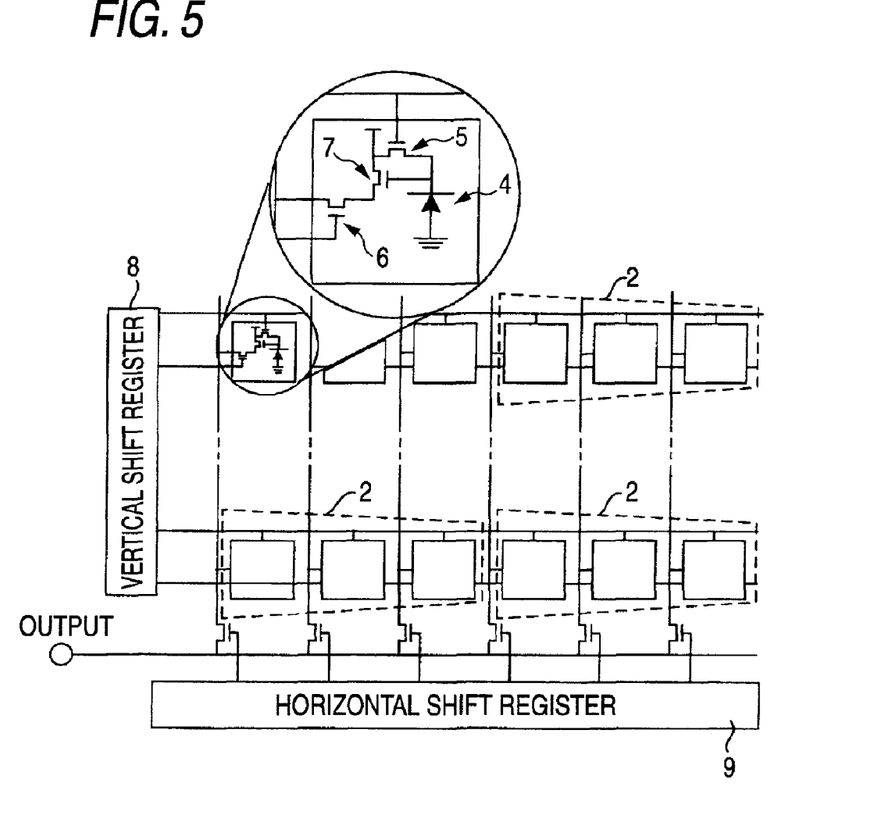
FIG. 5 is a circuit diagram of a light receiving element and a signal read circuit which are disposed on the lower side of the spectral element.

FIG. 5 is a diagram exemplifying a signal read circuit and wiring connection of each photodiode. In this FIG. 5, the signal read circuit and the wiring connection are utterly the same as those used in an ordinary CMOS type image sensor. A read circuit of a three-transistor configuration including a reset transistor 5, a read transistor 6, and an amplifier transistor 7 is added to each photodiode 4, and the operation of these transistors is adapted to be controlled by a vertical shift transistor 8 and a horizontal shift transistor 9.

Although the three-transistor configuration is illustrated by way of example, it is also possible to adopt a four-transistor configuration.

In the configuration shown in this FIG. 5, each opening 2 in FIG. 4 is provided so as to lie over the three consecutive photodiodes 4. The transistors and wirings other than those of the photodiodes 4 shown in FIG. 5 are provided in regions which do not overlap the openings 2, and are shielded from light.

In this way, as the solid-state imaging device is constituted by using the spectral elements 1 in substitution of the color filters, the light utilization efficiency is enhanced, and sampling pints of optical images detected by the unit pixel, i.e., the three consecutive transistors 4r, 4g, and 4b, become identical since the opening 2 is identical, thereby making it possible to capture a high-quality color image.

Figure 6:
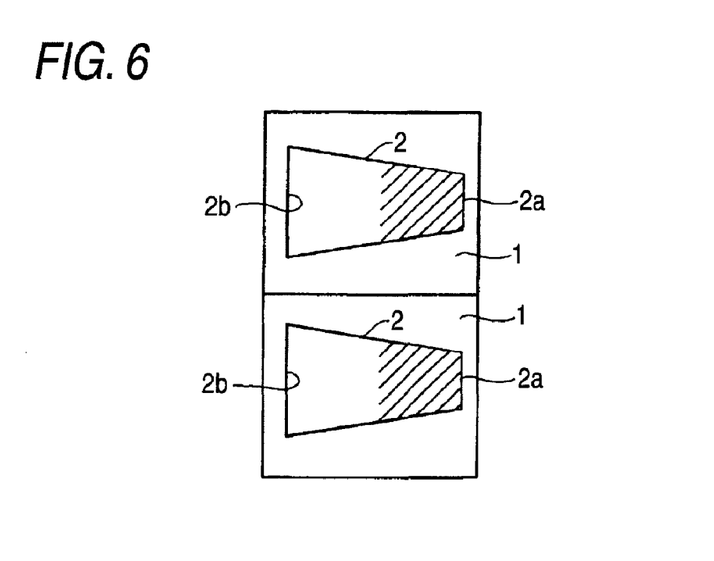
FIG. 6 is an arrangement configuration diagram of two spectral elements.

In the spectral elements 1 shown in FIG. 4, the orientation of each spectral element 1 is made identical. Namely, as shown in FIG. 6, each spectral element 1 is arranged such that the base 2b of each trapezoidal opening 2 is set on the left side, and the upper side 2a thereof is set on the right side. In the spectral element 1, it is necessary to allow the longitudinal direction of the opening 2 and the polarization orientation to coincide with each other. If the configuration of FIG. 4 is adopted, the gap portion produced between the short sides 2a of the two trapezoidal openings 2 becomes wide, and a region where the light cannot be received is formed, resulting in a decline of the light utilization efficiency. Accordingly, in the respective embodiments which will be described hereafter, measures are devised in the orientation of the trapezoidal openings 2 to attain further improvement of the light utilization efficiency.

Figure 7A:
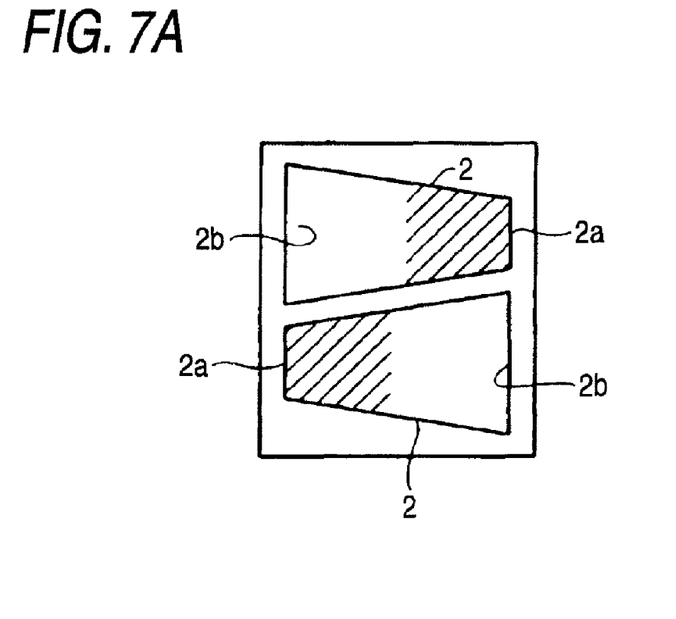
FIGS. 7A and 7B are arrangement configuration diagrams different from that of FIG. 6.
Figure 7B:
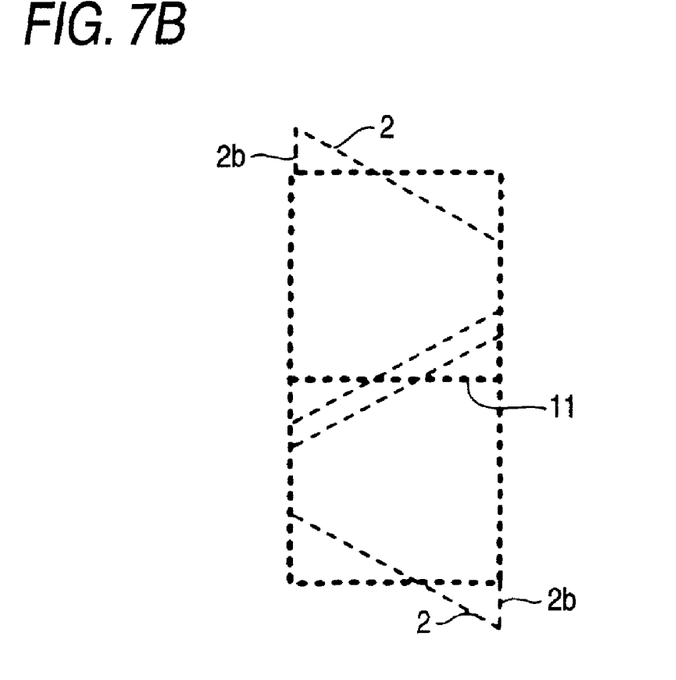

In an embodiment shown in FIG. 7A, the two adjacent openings 2 in terms of their orientation are arranged opposite to each other such that the gap between the two openings 2 becomes narrow, so as to render narrow the region where the incident light is not incident upon the photodiode. FIG. 7B is a diagram explaining the effect of this example of arrangement, and the trapezoidal openings 2 are illustrated in an exaggerated fashion to facilitate the understanding thereof. As the bases 2b of the vertically adjacent two trapezoidal openings 2 are arranged to overlap on a central horizontal line 11, the upper and lower two unit pixels are arranged in an entangled manner. As a result, the incident light which is incident upon one spot at a boundary portion enters the two unit pixels.

In a conventional digital camera, to avoid moire and a false color due to folded distortion generated by the fact that pixels are periodically arranged, optical low-pass filters are essential, which has been one factor pushing up the cost of the digital camera. However, as shown in FIG. 7A, if the respective unit pixels are arranged in an entangled manner, it becomes possible to reduce image deterioration due to the folded distortion even if optical low-pass filters are not used.

Figure 8:
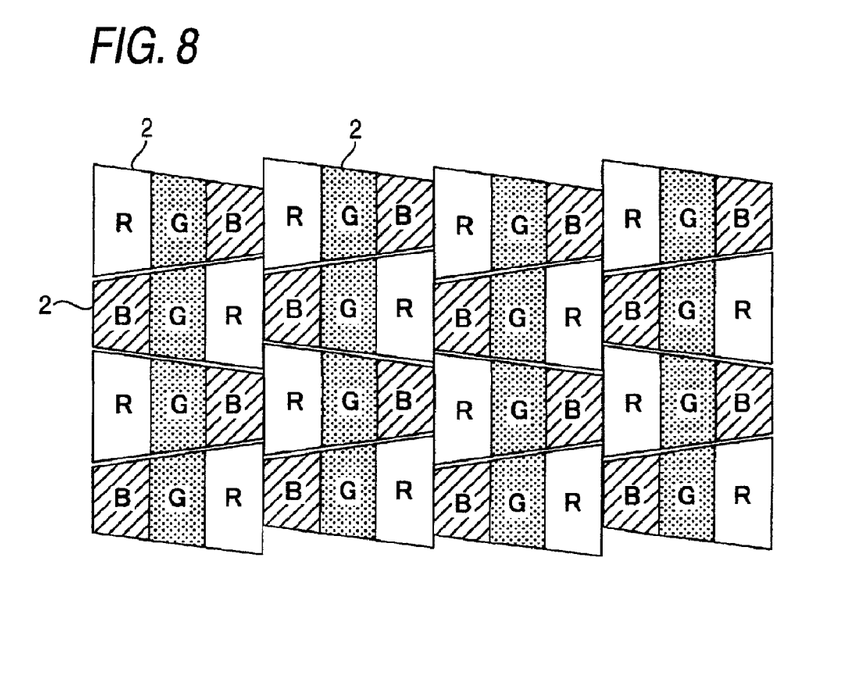
FIG. 8 is a layout diagram of unit pixels of the solid-state imaging device in accordance with a first embodiment of the invention.

FIG. 8 is a diagram illustrating an embodiment in which the arrangement shown in FIG. 7A is periodically repeated. In this embodiment, the structure adopted is such that the orientation of the respective trapezoidal openings 2 in even-numbered rows of unit pixels is arranged opposite to the orientation of the respective trapezoidal openings 2 in odd-numbered rows of unit pixels, and the unit pixels are densely arranged with practically no gaps therebetween in the form of a square lattice.

As such an arrangement is adopted, it becomes possible to realize a solid-state imaging device in which the unit pixels are arranged in the lattice form, and the processing of captured signals is facilitated, and which does not require optical low-pass filters.

It should be noted that, needless to say, it is possible to adopt an arrangement structure in which the arrangement of FIG. 8 is rotated 90 degrees, and this also applies to the other embodiments which will be described below.

Figure 9:
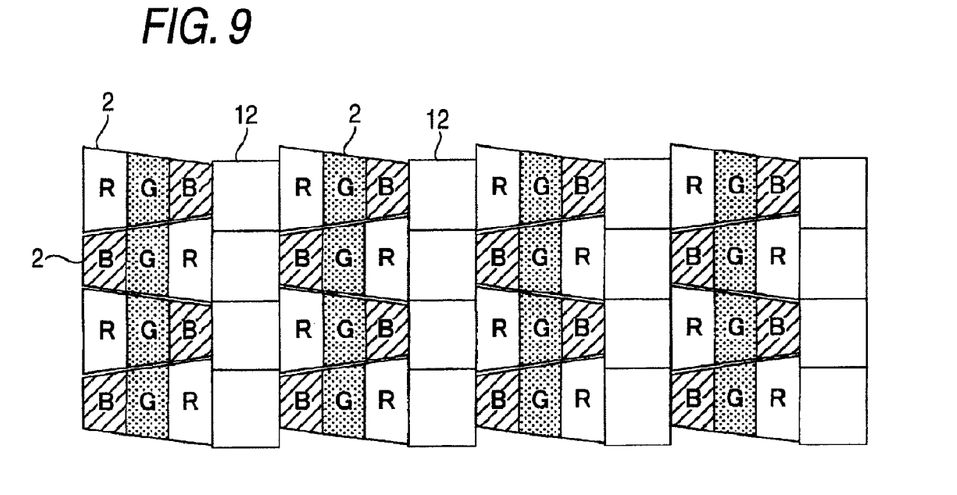
FIG. 9 is a layout diagram of the unit pixels of the solid-state imaging device in accordance with a second embodiment of the invention.

In FIG. 9, in the arrangement structure shown in FIG. 8, wide light shielding film portions (portions where the openings 2 are not provided) 12 are provided between columns of the unit pixels. Although the solid-state imaging device provided with the signal read circuit shown in FIG. 5 is a CMOS type, the embodiment shown in FIG. 8 is applicable to a CCD type solid-state imaging device as well. In the CCD type solid-state imaging device, however, since vertical charge transfer paths are required, the light shielding film portions 12 are provided at locations where the vertical charge transfer paths are provided.

Figure 10:
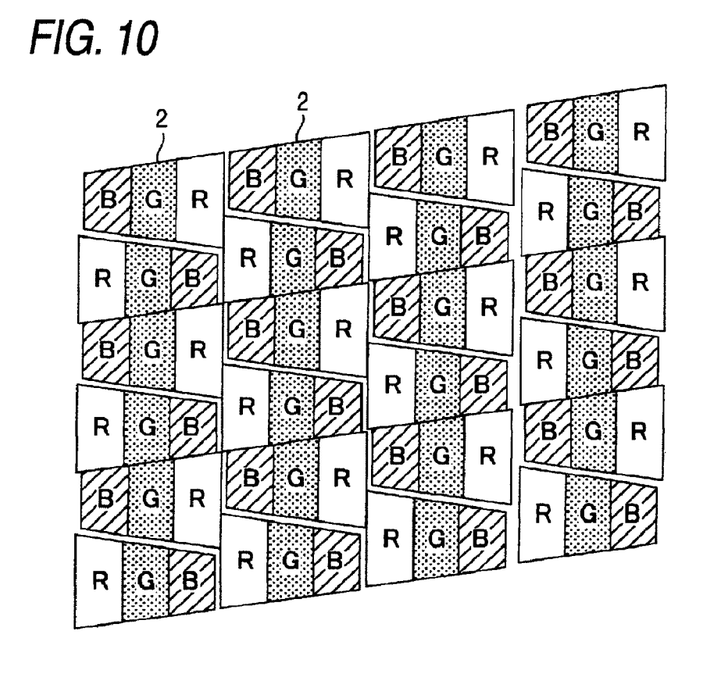
FIG. 10 is a layout diagram of the unit pixels of the solid-state imaging device in accordance with a third embodiment of the invention.

FIG. 10 is based on the arrangement structure of FIG. 8, but is characterized in that one lateral sides of the trapezoidal openings 2 in each odd-numbered row are arranged so as to form a continuous straight line.

Figure 11:
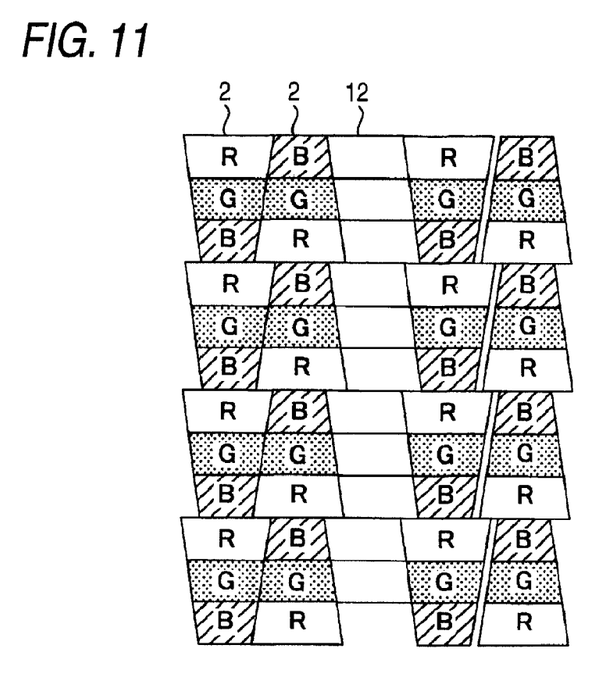
FIG. 11 is a layout diagram of the unit pixels of the solid-state imaging device in accordance with a fourth embodiment of the invention.

In FIG. 11, the configuration adopted is such that, in terms of the arrangement, the arrangement structure shown in FIG. 8 is rotated 90 degrees, and the light shielding film portions 12 are provided along the column of the unit pixels. In the illustrated example, one column of the light shielding film portions 12 is provided for two columns of the unit pixels, and the vertical charge transfer path is formed on the lower side of these light shielding film portions 12.

Figure 12:
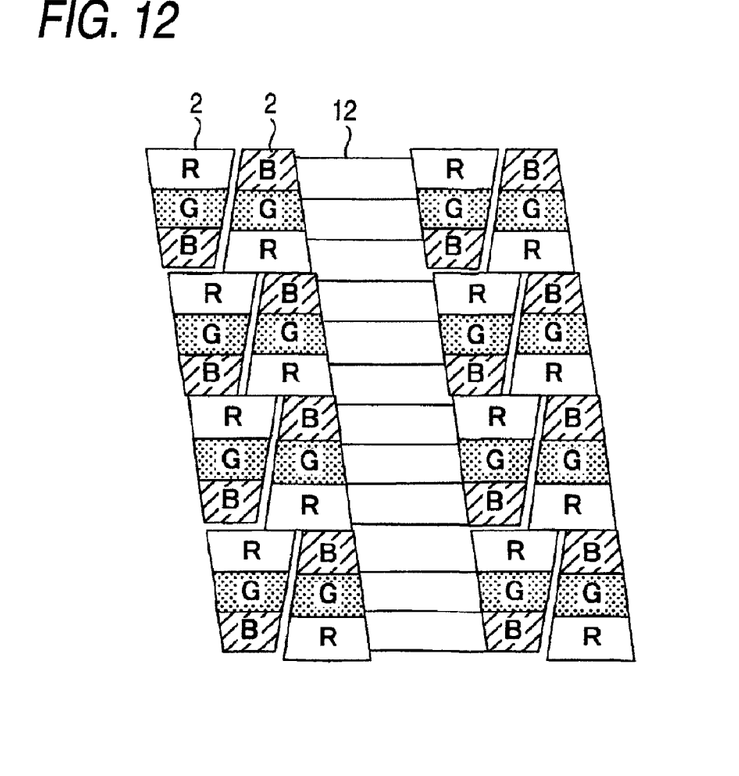
FIG. 12 is a layout diagram of the unit pixels of the solid-state imaging device in accordance with a fifth embodiment of the invention.

In FIG. 12, the basic configuration is identical to the arrangement configuration of FIG. 11, but FIG. 12 differs in that the unit pixels are arranged such that edges of the light shielding film portions 12 contiguous to the unit pixels are arranged so as to form a continuous straight line. If there are narrow or stepped portions as in the light shielding film portions 12 shown in FIG. 11, the applied electric field to transfer electrodes of the vertical charge transfer path becomes non-uniform at these portions, possibly causing faulty transfer. For this reason, in the configuration of FIG. 11, the width of the vertical charge transfer path must be made narrow to obtain a uniform width, but if the configuration of FIG. 12 is adopted, there is an advantage in that the vertical charge transfer path can be formed to the full width of the light shielding film portion 12.

Figure 13:
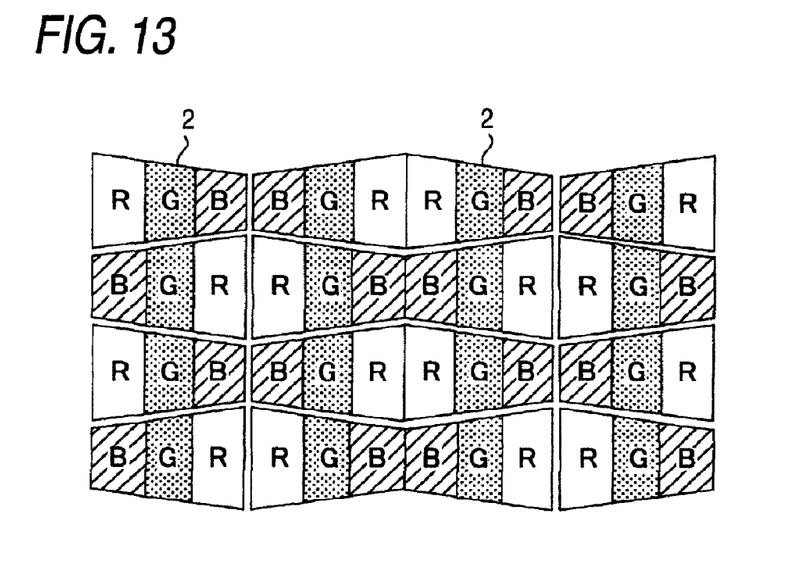
FIG. 13 is a layout diagram of the unit pixels of the solid-state imaging device in accordance with a sixth embodiment of the invention.

In FIG. 13, the unit pixels in the direction of rows (in the horizontal direction) are arranged such that bases and upper sides of the trapezoidal openings 2 are adjacent to each other, and the unit pixel columns are arranged such that in the adjacent unit pixels in the vertical direction the base sides and the upper sides are alternately arranged. Thus the light receiving surface of the solid-state imaging device is densely filled with the unit pixels with practically no gaps therebetween.

If this configuration is adopted, since the light utilization efficiency is enhanced, and photodiodes for reading detection charges of the same color are located in close proximity to each other, there is an advantage in that the wirings for reading the signals of the same color can be made common, making it possible to achieve a reduction in the number of wirings.

Figure 14:
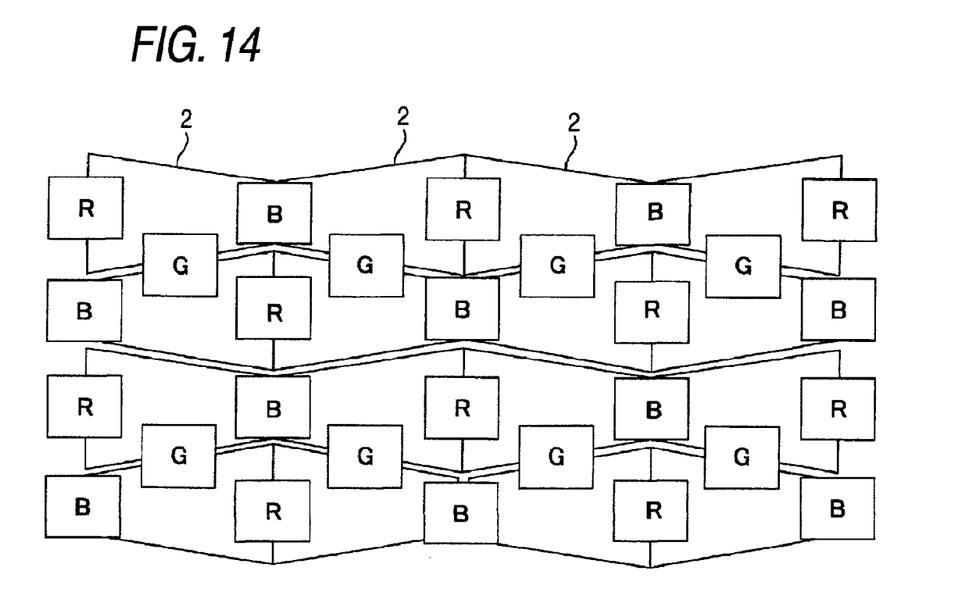
FIG. 14 is a layout diagram of detection signals of respective colors when pixel addition is effected by the solid-state imaging device shown in FIG. 13.

FIG. 14 is a diagram illustrating sampling positions of the respective colors in a case where, in the arrangement configuration of FIG. 13, detection charges of photodiodes in photosensitive regions of the same colors are subjected to addition read, i.e., signals are read by effecting pixel addition.

As for red (R), the position of the center of gravity of two horizontally adjacent unit pixels (trapezoidal openings 2) whose bases are adjacent to each other becomes a sampling position of a red signal subjected to addition read. As for blue (B), the position of the center of gravity of two horizontally adjacent unit pixels whose upper sides are adjacent to each other becomes a sampling position of a blue signal subjected to addition read. As for green (G), the position of the center of gravity of two vertically adjacent unit pixels becomes a sampling position of a green signal subjected to addition read.

The arrangement of R, G, and B shown in FIG. 14 is identical to the arrangement of R, G, and B of a conventional solid-state imaging device, such as is disclosed in JP-A-2007-189022, i.e., a solid-state imaging device of the so-called honeycomb pixel arrangement in which pixels in even-numbered rows are formed by being offset a ½ pixel pitch each with respect to pixels in even-numbered rows, and in which a color filter of green (G) is laminated on the pixels in odd-numbered rows, and color filters of red (R) and blue (B) are alternately laminated on the pixels in even-numbered rows. For this reason, there is an advantage in which the detection signals R, G, and B in FIG. 14 can be processed by the same signal processing method as that of this conventional III.

Figure 15:
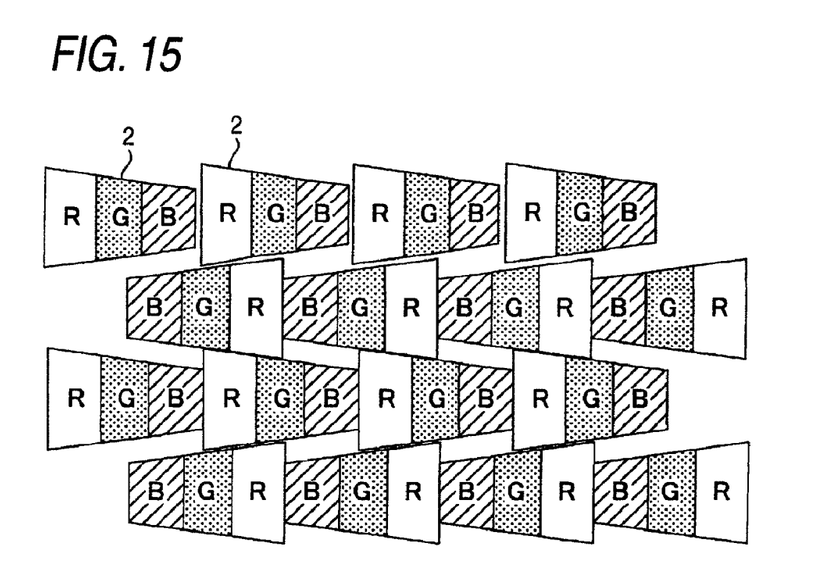
FIG. 15 is a layout diagram of the unit pixels of the solid-state imaging device in accordance with a seventh embodiment of the invention.

In FIG. 15, an arrangement configuration is adopted in which, in the arrangement configuration of FIG. 8, the positions of the bases of the trapezoidal openings 2 in each row are provided by being offset so as to be located at central positions of the trapezoidal openings 2 in a following row. Namely, even-numbered rows of unit pixels are arranged offset by a ½ pitch with respect to odd-numbered rows of unit pixels, so that the respective unit pixels are configured to be located at checkered positions of a square lattice.

If captured signals at portions where the unit pixels are not present at the remaining checkered positions of the square lattice are determined by performing interpolation operation by detection signals of the surrounding unit pixels, it is possible to further enhance the resolution in both the horizontal direction and the vertical direction than the arrangement configuration of FIG. 8.

Figure 16:
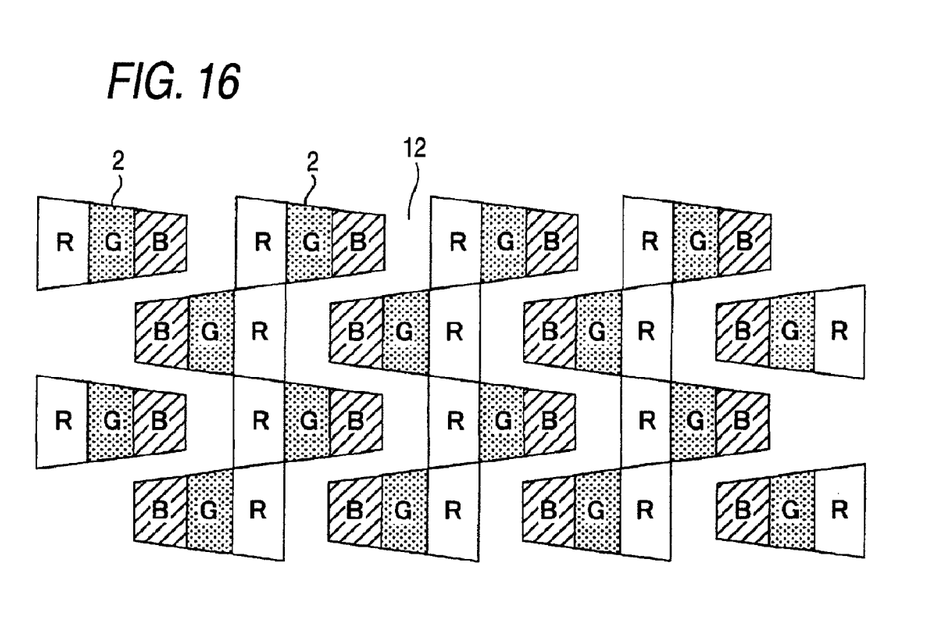
FIG. 16 is a layout diagram of the unit pixels of the solid-state imaging device in accordance with an eighth embodiment of the invention.
Figure 17A:
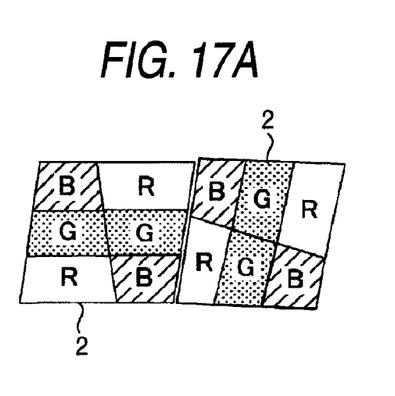
FIGS. 17A to 17D are diagrams illustrating forms of combination of the spectral elements for detecting bidirectionally polarized light.
Figure 17B:
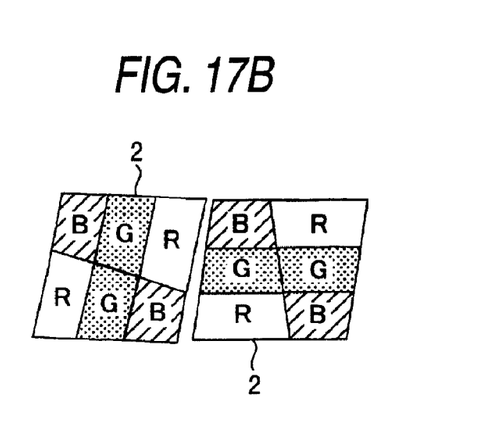
Figure 17C:
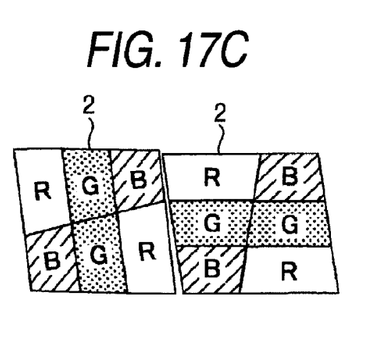
Figure 17D:
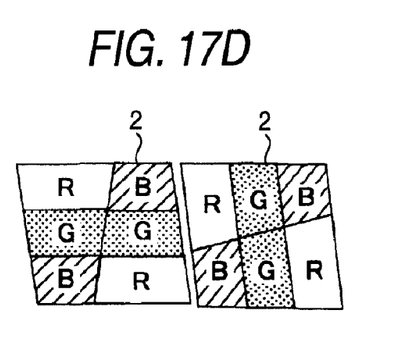

In FIG. 16, in the arrangement configuration of FIG. 8, even-numbered rows of unit pixels are further offset, and gaps (light shielding film portions) are provided between horizontally adjacent ones of the unit pixels, such that red color sensitive portions of the unit pixels arranged in the vertical direction are arranged in columns, green color sensitive portions are also arranged in columns, and blue color sensitive portions are also arranged in columns.

By virtue of this configuration, the vertical charge transfer paths can be formed in such a manner as to meander in the vertical direction in conformity with all the photosensitive portions of the respective colors of the unit pixels. For this reason, it becomes possible to easily effect signal reading from the photosensitive portions (photodiodes) of the respective colors of the respective unit pixels to the vertical charge transfer path.

Each of FIGS. 17A, 17B, 17C, and 17D shows forms in which two sets of paired trapezoidal openings 2 shown in FIG. 7A are combined, and the aggregate of the four unit pixels as a whole forms a parallelogram isosceles. In the case where the aforementioned polarizing element is not provided, the spectral element 1 spectrally separates the light by responding more sensitively to the light polarized in the longitudinal direction (heightwise direction) of the trapezoidal opening 2. Therefore, in the case where the longitudinal directions of the trapezoidal openings 2 are combined in the orthogonal direction, as shown in FIGS. 17A, 17B, 17C, and 17D, the spectral elements 1 separates the light by responding to the bidirectionally polarized light.

Figure 18:
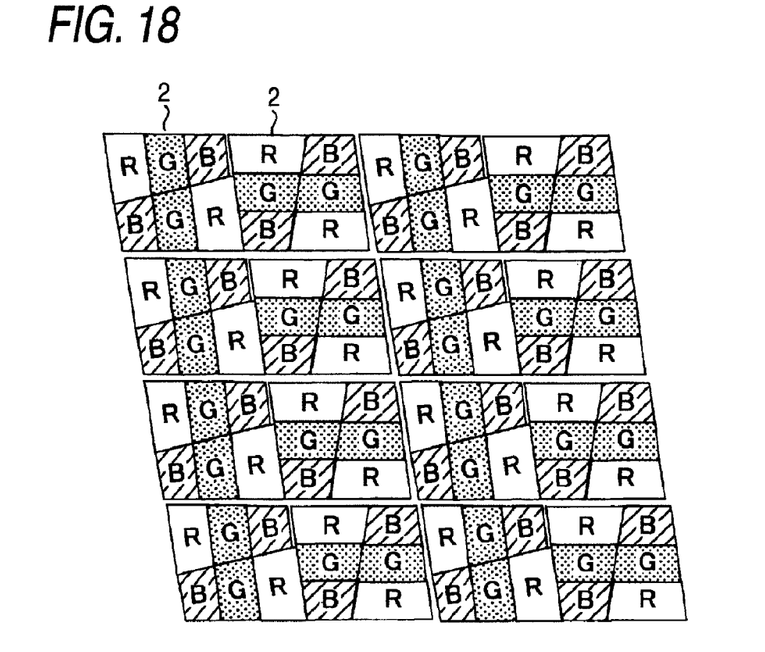
FIG. 18 is a layout diagram of the unit pixels of the solid-state imaging device in accordance with a ninth embodiment of the invention.
Figure 19:
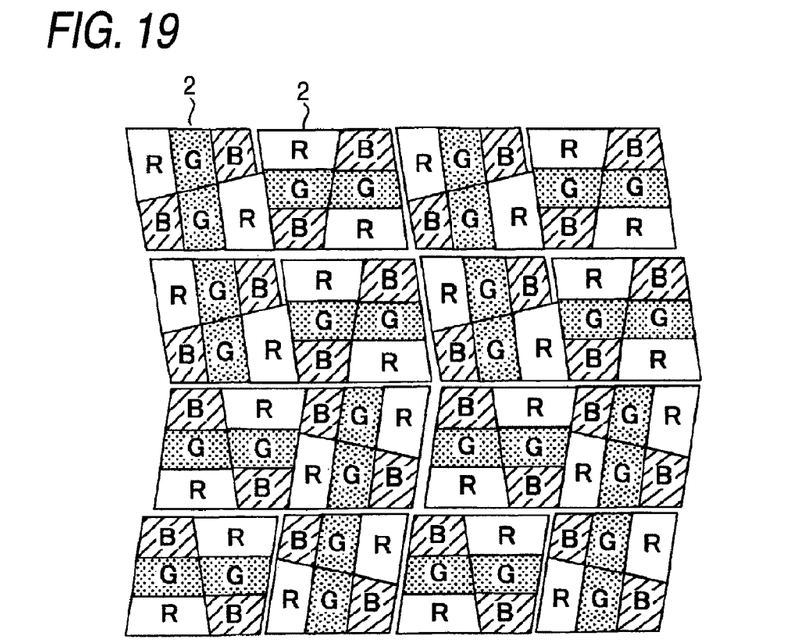
FIG. 19 is a layout diagram of the unit pixels of the solid-state imaging device in accordance with a 10th embodiment of the invention.
Figure 20:
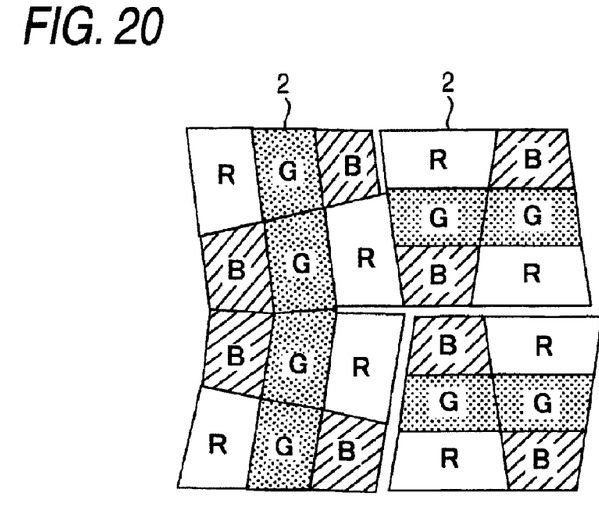
FIG. 20 is a layout diagram of the unit pixels of the solid-state imaging device in accordance with an 11th embodiment of the invention.
Figure 21:
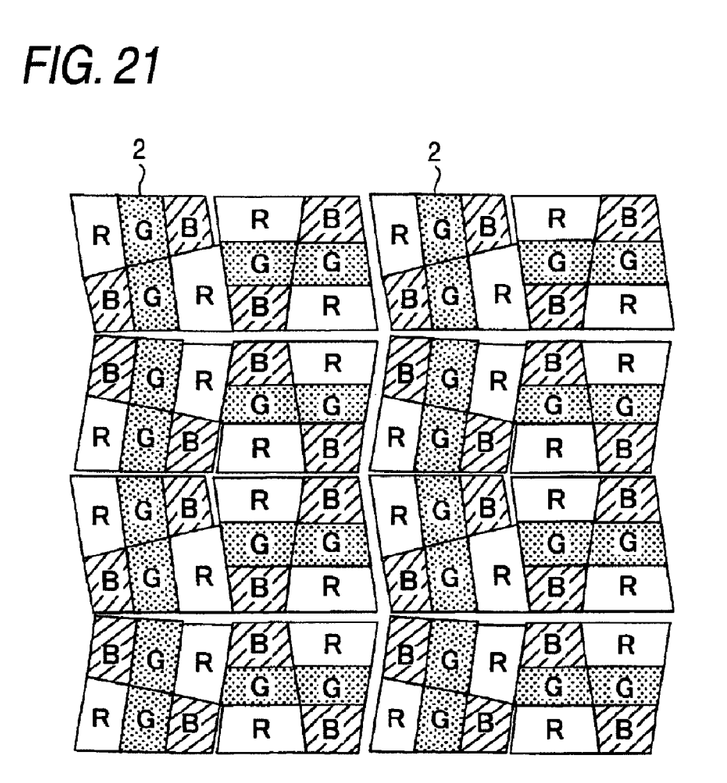
FIG. 21 is a layout diagram of the unit pixels of the solid-state imaging device in accordance with a 12th embodiment of the invention.

FIGS. 18 and 19 show configurations in which the unit pixels are densely arranged on the light receiving surface with practically no gaps therebetween by using the combination shown in FIGS. 17A, 17B, 17C, and 17D. FIGS. 20 and 21 show examples in which photosensitive portions of the same color are arranged adjacent to each other by using adjacent unit pixels. As the photosensitive portions of the same color are arranged adjacent to each other, it is possible to attain a reduction in the number of wirings, as described above.

According to the solid-state imaging device in accordance with the invention, the light utilization efficiency is high, and signals of a plurality of colors required for capturing a color image are detected by the unit pixel at an identical sampling point. Therefore, the solid-state imaging device in accordance with the invention is useful as a solid-state imaging device for high-sensitivity shooting and capturing high-quality images.

Although the invention has been described above in relation to preferred embodiments and modifications thereof, it will be understood by those skilled in the art that other variations and modifications can be effected in these preferred embodiments without departing from the scope and spirit of the invention.

What is claimed is:

1. A solid-state imaging device for capturing a color image comprising:
   a plurality of photoelectric conversion elements provided at a surface portion of a semiconductor substrate by being arranged in a form of a two-dimensional array;
   spectral elements each provided on a number of the photoelectric conversion elements which are arranged linearly, a trapezoidal opening which is longitudinally elongated in a direction from a base toward an upper side thereof and which introduces incident light to the number of the photoelectric conversion elements being provided in each of the spectral elements, so as to cause spectral separation in the longitudinal direction by interference between the incident light and light reflected on inner side surfaces of the trapezoidal opening; and
   a signal reading unit for reading a signal which is detected by each of the number of the photoelectric conversion elements arranged in the longitudinal direction by receiving the light incident through the trapezoidal opening.

2. The solid-state imaging device for capturing a color image according to claim 1, wherein in case the trapezoidal opening and the number of the photoelectric conversion elements arranged in the longitudinal direction of the trapezoidal opening are set as a unit pixel, orientations in the direction from the base toward the upper side of two unit pixels adjacent to each other on a lateral side of the trapezoidal opening are arranged opposite to each other.

3. The solid-state imaging device for capturing a color image according to claim 2, wherein the unit pixels are arranged in a lattice form.

4. The solid-state imaging device for capturing a color image according to claim 2, wherein lateral sides of the trapezoidal openings which are adjacent to each other in the longitudinal direction are arranged in a straight line.

5. The solid-state imaging device for capturing a color image according to claim 2, wherein the two trapezoidal openings which are adjacent to each other in the longitudinal direction are arranged with the bases or the upper sides thereof adjacent to each other.

6. A signal addition method of the solid-state imaging device for capturing a color image according to claim 5, comprising:
   adding signals which are read from positions of the bases of the two unit pixels whose bases are adjacent to each other;
   adding signals which are read from positions of the upper sides of the two unit pixels whose upper sides are adjacent to each other; and
   adding signals which are read from intermediate positions between the base and the upper side of the two unit pixels whose lateral sides are adjacent to each other.

7. The solid-state imaging device for capturing a color image according to claim 2, wherein even-numbered rows of the unit pixels are arranged offset by a ½ pitch with respect to odd-numbered rows of the unit pixels.

8. The solid-state imaging device for capturing a color image according to claim 2, wherein, in the unit pixels which are adjacent to each other in a perpendicular direction to the longitudinal direction, the photoelectric conversion elements for receiving the light of a same color are provided by being aligned in the perpendicular direction.

9. The solid-state imaging device for capturing a color image according to claim 2, wherein the unit pixels are arranged on the light receiving surface by using as a unit four of the unit pixels which form a parallelogram isosceles configured by adjoining a first pair in which two of the unit pixels adjacent to each other on the lateral side are arranged in mutually opposite directions and a second pair in which the first pair is rotated substantially 90 degrees.

10. The solid-state imaging device for capturing a color image according to claim 2, wherein the unit pixels are arranged such that positions of the unit pixels for detecting the same color are adjacent to each other.

* * * * *